CONTINUOUS METHOD OF TREATING CYANID SOLUTIONS.
APPLICATION FILED AUG. 24, 1914.
1,283,363.
Patented Oct. 29, 1918.
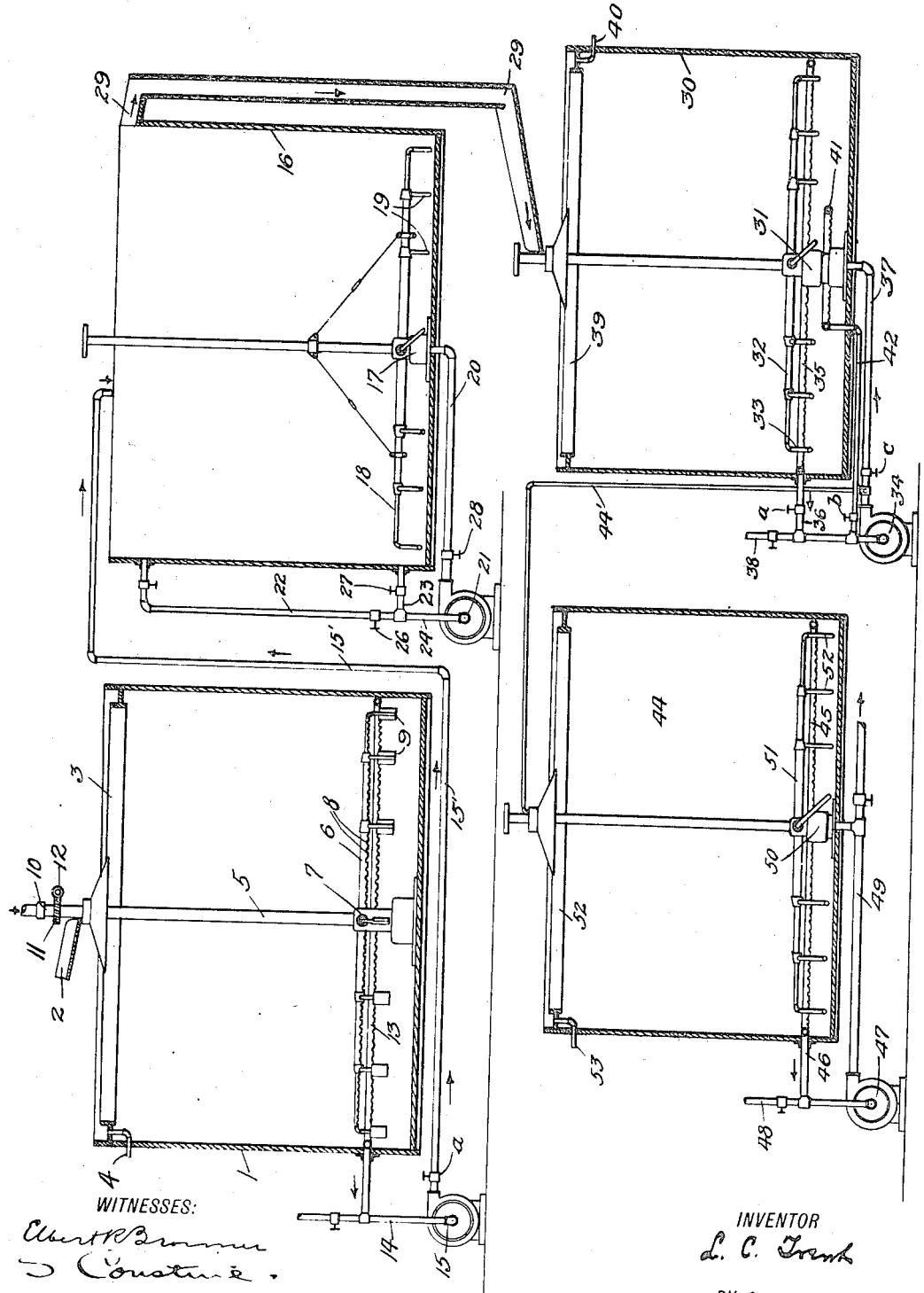

UNITED STATES PATENT OFFICE.

LAMARTINE C. TRENT, OF LOS ANGELES, CALIFORNIA

CONTINUOUS METHOD OF TREATING CYANID SOLUTIONS.

1,283,363.    Specification of Letters Patent.    Patented Oct. 29, 1918.

Application filed August 24, 1914. Serial No. 858,409.

*To all whom it may concern:*

Be it known that I, LAMARTINE C. TRENT, a citizen of the United States, residing at Los Angeles, in the county of Los Angeles and State of California, have invented certain new and useful Improvements in Continuous Methods of Treating Cyanid Solutions, of which the following is a specification.
The hereinafter described invention relates to an improved method for the continuous treatment of slimes and pulps for the recovery of values therefrom, more particularly ore and other mineral pulps in the treatment of which chemical solutions, water only or other solvents are used, and has been designed with especial reference to the extraction of gold and silver from their ores with cyanid solutions. It has for its object to treat crushed or pulverized material delivered to it as slime or pulp from any appropriate source, and to provide for the different stages of extraction and separation of values, to finally include the delivery of valuable and recovered solutions for further treatment and the discharge of tailings pulp, a further object being to dispense with the necessity of the employment of filters and by so doing eliminating the expense incidental thereto while at the same time producing a simpler, more efficient and less expensive method of treatment than the ones in common use at the present time.

The invention consists in subjecting the slimes as received to a settling and thickening action in order to separate excess liquid contained therein or to settling and the replacement of the carrier liquid with such other liquid as the case may require, removing the thickened material and subjecting it to agitation and circulation for dissolving values contained therein, subsequently treating the pulp by introducing a barren solution or a different liquid causing agitation in said material under treatment, the purpose being to add an active solvent for dissolving residual values and also to displace and replace pregnant solution therewith and following this with a similar treatment of replacement of solution by means of water for the recovery of the solvent and its contained values, and for the separation of a tailings pulp which is practically freed from soluble values.
The process may thus be said to comprise three purposes and four steps as described in the foregoing, each of which steps may be subdivided into two or more similar steps, said purposes being—first, thickening of the slimes and the removal of a part of the liquid therefrom, or, as the case may require, the said thickening accompanied by replacement of the carrier liquid with solution for dissolving the metallic values, second, dissolving the metallic values from the material under treatment, and, third, separating the valuable solutions from the solids by replacement; these mentioned purposes being carried out in the process of a single operation during the continuous flow of material to be treated.

A further advantage gained by the use of the method described herein is that when used for treating cyanid slimes the solutions carrying the dissolved metallic values are removed as soon as possible after the values are dissolved providing a more efficient and economical recovery than is otherwise possible.

I am aware that according to conditions, modifications within the method of treatment as described herein, may be made, and I do not wish to be understood as confining myself to the details of the apparatus, or to any certain number of receptacles arranged in sequence for the different purposes.

Any suitable apparatus may be employed for carrying out the method, but preference is given to the use of the apparatus disclosed in the accompanying drawings, wherein is shown in vertical section an apparatus for carrying out the improved method of separating the values from the slimes.

In the drawings, the numeral 1 indicates a tank or vessel for the initial treatment of the pulverized material which is fed to the vessel as a slime in any suitable manner as by a launder 2, the said initial treatment being for settling and thickening the received slimes and for replacing liquid thereof with a solvent when required, the dimensions of the vessel being dependent on the tonnage capacity desired for the apparatus. The receiving vessel 1 is provided adjacent its upper edge with an overflow launder 3 for receiving separated clarified liquid, which is carried off through any suitable outlet 4, for disposal in any desired manner, said liquid when separated from slimes produced in the pulverization of ores in the presence of a solvent, frequently carrying high metallic values in solution.

Suspended at an adjustable height within the vessel 1 is a rotatable device consisting of a tubular shaft 5 which is closed at its lower end, and of hollow arms 6, which are connected to the shaft 5 by the hollow head 7, said arms 6 being each provided with one or more discharge openings 8 and a series of blades 9, a supply pipe 10 communicating with the upper end of the hollow shaft 5 for introducing a replacing liquid therein under pressure, the object of the device being to thicken the slimes, to introduce and distribute a liquid for replacing purposes and to produce the conditions desired for the replacement of the liquid received in the slimes for treatment the discharge openings of the arms 6 and the setting of the blades 9 thereof being arranged in such a manner as to cause the agitation required for the mentioned purposes. The shaft 5 is mounted for rotation in any suitable manner, rotation being imparted to the shaft by the gear wheel 11, and worm and pulley 12.

The material is withdrawn from the vessel 1 through the perforated outlet pipe 13, which is connected through a pipe 14, with the lift pump 15, said pump delivering the withdrawn material through the pipe connection 15′ into the agitating vessel 16. Within the vessel 16 adjacent the bottom thereof, is mounted for rotation an agitator comprising a hollow head 17, and hollow arms 18, each of which arms is provided with discharge nozzles 19, there being introduced into the head 17 a pipe 20, which connects with a rotary pump 21. The material within the vessel 16 is kept in constant agitation and circulation by means of the pump 21, material being withdrawn from the said vessel at its upper portion into the pump 21 by means of the connection 22, or from a point intermediate the ends of the vessel by means of the connection 23 through the suction pipe 24, the flow through the said pipe connections 22 and 23 being controlled by the valves 26 and 27 respectively. The material withdrawn from the vessel 16 into the suction pump 21 is returned to the said vessel 16 by means of the rotary agitator situated therein, the flow through pipe 20 leading to the agitator being regulated with a valve 28.

The material treated in the vessel 16 overflows therefrom into the launder 29, which conveys the said material to the replacing vessel 30, which is provided adjacent its bottom with a rotary agitator having a hollow head 31 suitably mounted for rotation and tubular arms 32 provided with discharge nozzles 33. Outside of the vessel 30 is located a suction pump 34, which withdraws material from within the said vessel 30 through the interiorly disposed perforated suction pipe 35 and pipe connections 36 and returns the said material into the vessel through the arms 32 of the agitator by means of the pipe 37, which said pipe delivers the material into the head 31 of the agitator. By this withdrawal and return of the material within the vessel 30, the said material is maintained in circulation and agitation while a replacing solvent is being added thereto through the valve controlled pipe 38 connected with the suction of the pump 34, for replacing pregnant solution and for dissolving residual values contained in the solids of the material under treatment, preferably but not necessarily with an upward flow of the replacing liquid within the vessel 30. The replaced and rising liquids separated within the vessel 30 are received in a discharge launder 39 and flow therefrom through an outlet 40 to a suitable place of deposit for after treatment. Situated near the bottom of the vessel 30 is a perforated suction ring 41, connected with a discharge pipe 42 and thence with the lift pump 34 for withdrawing the treated material from the vessel 30 and delivering it to the replacing vessel 44 through the pipe 44′, the quantity of material withdrawn for circulation and discharge being controlled by the valves $a$ and $b$ in pipes 36 and 42, the pipe 37 also being provided with a valve $c$. In the vessel 44, the material withdrawn from the vessel 30 mixes with the replacing liquid and receives another treatment by replacement in which water is used as the replacing liquid to recover solution containing dissolved chemical and metallic values from the said material, the quantity of water introduced for replacing purposes being approximately the quantity which is discharged in the tailings pulp with such additional quantity as may be required in continuous operation to make up for losses of water in discarded solutions, evaporation and in other manner, this being the stage of treatment for introduction of the make-up water.

Agitation is produced in the vessel 44 in the same manner as described for vessel 30, by withdrawing material from near the bottom of the vessel through the perforated suction pipe 45 and the pipe connections 46 into the suction pump 47, the replacing water being introduced through the valve controlled pipe 48, and delivering the discharge of the pump by means of the pipe 49 to an agitator situated within the vessel 44, the material thus delivered by the pump passing through the agitator comprising the head 50 and the radial arms 51 provided with discharge nozzles 52 as in the preceding vessel 30. The liquid overflowing from the vessel 44 is discharged into a launder 52, passing therefrom through an outlet 53 to a place of deposit and the same is available for use in any desired manner, and the tailings may be discharged from the vessel as desired.

By the described method, the separation of valuable solutions takes place in continuous overflows and the material under treatment subjected to agitation for dissolving values under conditions for continuous withdrawal of treated pulp, and the replacement of liquids comprising replacement with an ascending flow of replacing liquid and replacement without distinctive ascending flow of replacing liquid, the replacements being conducted by the introduction of replacing liquid within the material treated with such agitation as may be required, avoiding the use of structural barriers in the pulp within the vessels and the use of filters for the pulp and treatment by successive dilutions and decantations, and excessive dilution of solutions, effecting thereby an economical and practical method of continuous replacement and of slime treatment. Delivery of the material for treatment by the method may be made at the first step described or at any intermediate step involving two or more steps of the described treatment.

The details of the apparatus as described herein are not essential to the execution of the method. The agitators located within the various vessels may be driven in any suitable manner for imparting such agitation as may be required, and the use of pumps and the withdrawal of pulp for outside circulation may be dispensed with, the replacing liquids may be introduced in any desired manner, the delivery of material to different steps of treatment may be effected as desired, and any suitable means may be employed for effecting the other described purposes, nor is the method limited to the details of operation as described for the different steps. Two successive treatments of replacement such as the third and fourth steps of the method as described herein may be conducted in one vessel, by introducing the two different replacing liquids at different levels within the said vessel, agitation being imparted as required.

Having thus described the invention, what is claimed as new and desired to protect by Letters Patent is:—

1. The continuous method of treating slimes, containing values to be extracted and solvents therefor, for the recovery of the values contained therein, which consists in settling and thickening the material and separating therefrom liquid containing values in solution for after treatment, then withdrawing the thickened material and subjecting the same to agitation and circulation for the purpose of dissolving values contained therein, then withdrawing the material under treatment and subjecting it to agitation while displacing and replacing the liquid of the material under treatment with an active barren solvent or one carrying less values than the liquid of the material under treatment, disposing of the separated pregnant solution for after treatment, then withdrawing the material treated and subjecting it to agitation while displacing and replacing the liquid of the material under treatment with water or a liquid carrying less value than the liquid of the material under treatment at this stage of the process, separating thereby a valuable liquid and a tailings pulp for final disposal.

2. The continuous method for the described purpose of extracting values from slimes by means of solvents, which consists in settling and thickening the material received for treatment, then introducing under agitation a solvent for the purpose of displacing and replacing liquid received with the slimes, removing the displaced and replaced liquid, then agitating the material in mixture with the solvent for the purpose of dissolving values from the said material, then adding a barren solvent or a solvent carrying less values (in solution) than the liquid of the material under treatment, and agitating the same with material being treated for displacing and replacing solution with the solvent, and for dissolving residual values, withdrawing the recovered solution for subsequent treatment, then introducing water under agitation for replacing solution existent in the material being treated for the separation of a liquid carrying chemical and recovered values in solution and of a tailings pulp for removal from the process.

3. The continuous method of treating ore slimes for the recovery of values therefrom, said method including treating the material in successive stages, all under agitation, each stage consisting in delivering the material for treatment in a stream into a receiving vessel and causing a gradual thickening and settling of the solids contained therein, introducing into the material a liquid for replacement purposes, and collecting the clear liquid at the surface, the thickened material collected from one stage being supplied as feed in the succeeding stage, and fresh replacing barren liquid being used at each stage of the treatment.

4. The continuous method of treating ore slimes for the recovery of values therefrom including treating the material in successive stages, each stage consisting in delivering the material for treatment in a stream into a receiving vessel and causing a gradual thickening and settling of the solids contained therein, introducing into the material a barren solution for replacement purposes, and collecting the clear pregnant liquid at the surface, the thickened material collected from one stage being supplied as feed in the succeeding stage and fresh replacing barren liquid being used at each stage of the treatment.

5. The continuous method of extracting values from slimes including subjecting the material in a vessel to circulation by withdrawing material from the upper part of the body of material and returning the same to the bottom part thereof for dissolving values contained therein, then withdrawing the material under treatment into a receiving vessel and subjecting the same therein at a lower part thereof to gentle agitation to form zones of separation including a lower thickened zone, during such agitation introducing into the thickened zone replacing liquid, and collecting the clear pregnant liquid at the surface.

6. The continuous method of treating slimes, containing values to be extracted and solvents therefor, for the recovery of the values contained therein, which consists in settling and thickening the material and separating therefrom liquid containing values in solution for after treatment, then withdrawing the thickened material and subjecting the same to gentle stirring and circulation for the purpose of dissolving values contained therein, then withdrawing the material under treatment and subjecting it to gentle stirring while displacing and replacing the liquid of the material under treatment with an active barren solvent or one carrying less values than the liquid of the material under treatment, collecting the separated pregnant solution for after treatment, then withdrawing the material treated and subjecting it to gentle stirring while displacing and replacing the liquid of the material under treatment with water or a liquid carrying less value than the liquid of the material under treatment at this stage of the process, separating thereby a valuable liquid and a tailings pulp for final disposal.

In testimony whereof I have signed my name to this specification in the presence of two subscribing witnesses.

LAMARTINE C. TRENT.

Witnesses:
   HARRY G. TOTTEN,
   D. B. RICHARDS.